US006336860B1

(12) United States Patent
Webb

(10) Patent No.: US 6,336,860 B1
(45) Date of Patent: Jan. 8, 2002

(54) GAME OF CHANCE USING PATTERNS OF SYMBOLS HAVING AT LEAST TWO DEFINING CRITERIA

(75) Inventor: Derek J. Webb, Derby (GB)

(73) Assignee: Prime Table Games LLC, Las Vegas, NV (US)

( * ) Notice: Subject to any disclaimer, the term of this patent is extended or adjusted under 35 U.S.C. 154(b) by 0 days.

(21) Appl. No.: 09/437,238

(22) Filed: Nov. 10, 1999

(51) Int. Cl.[7] .......................... A63F 13/00

(52) U.S. Cl. .......................... 463/22; 463/16; 463/20

(58) Field of Search .......................... 463/16, 19, 20, 463/22, 25; 273/274, 268, 234, 138.1, 138.2, 139, 146

(56) References Cited

U.S. PATENT DOCUMENTS

| | | | | | |
|---|---|---|---|---|---|
| 4,743,022 | A | * | 5/1988 | Wood | 273/85 |
| 5,125,660 | A | * | 6/1992 | Stahl | 273/146 |
| 5,344,145 | A | * | 9/1994 | Chadwick et al. | 273/138 |
| 5,362,052 | A | * | 11/1994 | Kubatsch | 273/145 |
| 5,580,053 | A | * | 12/1996 | Crouch | 463/20 |
| 5,695,193 | A | * | 12/1997 | Cheung | 273/274 |
| 5,732,950 | A | | 3/1998 | Moody | |
| 5,752,881 | A | * | 5/1998 | Inoue | 463/20 |
| 5,823,873 | A | | 10/1998 | Moody | |
| 5,964,463 | A | * | 10/1999 | Moore, Jr. | 273/274 |
| 5,976,016 | A | * | 11/1999 | Moody et al. | 463/13 |
| 6,093,102 | A | * | 7/2000 | Bennett | 463/20 |
| 6,120,377 | A | * | 9/2000 | McGinnis, Sr. et al. | 463/20 |
| 6,123,333 | A | * | 9/2000 | McGinnis, Sr. et al. | 273/146 |
| 6,126,541 | A | * | 10/2000 | Fuchs | 463/13 |

* cited by examiner

*Primary Examiner*—Jessica J. Harrison
*Assistant Examiner*—John M Hotaling, II
(74) *Attorney, Agent, or Firm*—Nixon & Vanderhye P.C.

(57) ABSTRACT

A casino game of chance incorporates a pattern of a plurality of symbols such as a matrix of dice or playing card images or the like. From this matrix, numerous single line and multi-line game versions having varying payoffs and volatility can be played, thereby offering a wide variety of games that would thus be desirable to players and casino operators.

38 Claims, 2 Drawing Sheets

GAME OF CHANCE USING PATTERNS OF SYMBOLS HAVING AT LEAST TWO DEFINING CRITERIA

BACKGROUND OF THE INVENTION

The present invention relates to games of chance and, more particularly, to games of chance defining winning patterns of symbols having at least two defining criteria, which patterns are randomly generated.

With the expansion of casino gaming, the trend toward machine games rather than table games and the attraction of video games over traditional slot reel games, there has been a growth in demand for new video casino games. The majority of these games, however, have many similarities to traditional slot reel games and/or other video casino games.

Secondary screens with bonus features or games within games have become popular. The secondary bonus games reduce the win frequency and payoff in the primary game to enable an extra payoff in the secondary game. Multi-line games have also become popular, wherein, for example, all visible horizontal lines may be played rather than a single middle line. Other lines such as diagonals may also offer payoffs. Multi-line play in a video poker format is described in, for example, U.S. Pat. Nos. 5,823,873 and 5,732,950. Multi-line play allows a hand to be played on multiple lines with the subsequent draw as in original video poker applying to all hands. All multi-line games require multiple credits to play; that is, to play a three-line game for a maximum of five units per line requires fifteen credits, being three times the number of credits to play the traditional single line. Whilst the majority of players may play a multi-line game in the same monetary value denomination as a single line game, some players may trade down to a lower denomination, which is undesirable to the casino operator. Additionally, with multi-line play, the actual hit frequency increases although the win frequency may be lower. When a player with fifteen credits has two winning lines paying five credits each, the result is that there is actually a loss of five credits. In single line play, a partial loss situation could not occur as the minimum winning result is a return of the full five credits.

The mathematics of gaming dictate that where hit frequency increases, payoffs must decrease, therefore, game volatility is affected. Volatility is the comparative relationship between high payoffs, low payoffs and losses. A high volatility offers prospects of a positive result and may attract a more serious gambler, whereas limited volatility may attract a player wishing to pass the time.

Both multi-line games and secondary bonus games are thus not necessarily as attractive to traditional players.

SUMMARY OF THE INVENTION

With the modes of play according to the present invention, the game of chance is played using symbols having two or more defining criteria. For example, playing card symbols have two criteria, being rank and suit. These and other criteria are combined to create innovative modes of play, for example, using color, shape and designation through means such as letters or numbers. The game is played in a dedicated unit with displayed informational and promotional material, which may be shown on the video display or other screens. The actual game is played on the video display via a video game unit that is programmed via computer software.

The screen incorporates specific display areas, for example, nine areas, defining a matrix of symbols and creating a total of eight lines, being three vertical, three horizontal and two diagonal. A player may elect to play lines or totals or both. Lines indicates a payoff for a line qualification, and totals indicates a payoff for a total qualification, irrespective of exact line location. Preferably, a player playing totals must play the minimum number of credits that would be required to play all lines.

After establishing credits within any of the customary prepayment formats and determining the denomination of credits, if applicable, the player is ready to participate in the game. The player may choose to participate in either or both lines and totals by playing double credits. This principle is extended to any game mode available, and each game mode has a dedicated payoff scale, which may be accessed through the video display.

Whatever symbols or number of areas and lines are used, certain principles apply. In terms of visual presentation, each area could display an individual revolving aspect with each of the appropriate symbols shown in proportion. Alternatively, the individual winning symbols could zoom into place from one of the screen perimeters, being one of four sides in most screen formats, with cascading from the top downward being an attractive choice. Those skilled in the art will realize that a number of visual presentations could easily apply.

Additionally, each mode could allow, after a first credit play, the ability to retain favorable symbol combinations for a subsequent play. In conjunction with the symbol retention, each mode could incorporate either no credits paid on the first round or a reduced payoff scale on the second round or both features. The retention in each version could be increased and progressed to subsequent rounds with incorporation of appropriate credit and payoff parameters.

In an exemplary embodiment of the invention, there is provided a method of playing a game of chance including the steps of (a) establishing at least one winning pattern of a plurality of symbols, wherein the symbols include six-sided dice and at least one additional defining criteria such as shape or color; (b) receiving a first wager from a player that the winning pattern will occur; (c) randomly generating a resulting pattern of the symbols; and (d) if the resulting pattern matches the winning pattern, paying a payout based on the first wager. Step (c) may be practiced by (c1) defining a matrix of symbols, and step (a) may be practiced by (a1) establishing the winning pattern as a line of the symbols from the matrix. Step (c1) may be further practiced by defining the matrix of symbols as a square matrix, and step (a1) may be practiced by defining lines of symbols along columns, rows and diagonals on the matrix. In this context, step (b) is preferably practiced by receiving an additional wager for each of additional ones of the lines to be played. Step (a) may be practiced by establishing a first winning pattern as a plurality of symbols all having the same one of the at least two defining criteria.

In a step (e), the method may include providing an option for the player to wager a second wager that the winning pattern will occur through a second selective regeneration of the resulting pattern, if the resulting pattern does not contain a match to the winning pattern. In this context, if the second selective regeneration of the resulting pattern matches the winning pattern, a payout based on the second wager is paid. This payout may be varied based on a ranking achieved in the first generation of the resulting pattern.

The payouts may thus be varied according to a rank of the combinations. The payouts may further be varied according to symbol colors or shapes. The defined matrix may be a 4×6 matrix of symbols with the winning pattern being established as a line of the symbols from the matrix.

Step (c) may be practiced by defining a matrix of symbols and establishing the resulting pattern as a selection of the symbols from the matrix. In this context, step (b) is preferably practiced by receiving a wager for each selected row in the matrix.

As an alternative, the symbols may include six-sided dice of four varying colors, defining twenty-four symbol variations, wherein step (c) includes defining a 5×5 matrix of symbols including the twenty-four symbol variations and one wild indicia. The winning pattern may be established based on poker-style combinations.

In accordance with another aspect of the invention, there is provided an apparatus configured for playing a game of chance including a display, a player interface for receiving player input, and a processor configured to effect game play, wherein the processor enables the method according to the present invention.

In accordance with yet another aspect of the invention, there is provided a method of playing a game of chance including the steps of (a) establishing at least one winning pattern of a plurality of symbols, wherein each of the symbols includes at least three defining criteria; (b) receiving a first wager from a player that the winning pattern will occur; (c) randomly generating a resulting pattern of the symbols; and (d) if the resulting pattern matches the winning pattern, paying a payout based on the first wager. The symbols may include playing cards, wherein step (a) is practiced by establishing the winning pattern with the playing cards according to poker-style combinations.

In accordance with still another aspect of the invention, a method of playing a game of chance includes the steps of (a) generating a matrix of symbols, wherein each of the symbols includes at least two defining criteria; (b) receiving a wager from a player; (c) enabling a player to select a mode of play and establish at least one winning pattern of the symbols, wherein the selected mode of play affects the rules of the games; (d) randomly generating a resulting matrix of the symbols; and (e) if the resulting matrix matches the winning pattern, paying a payout based on the first wager.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
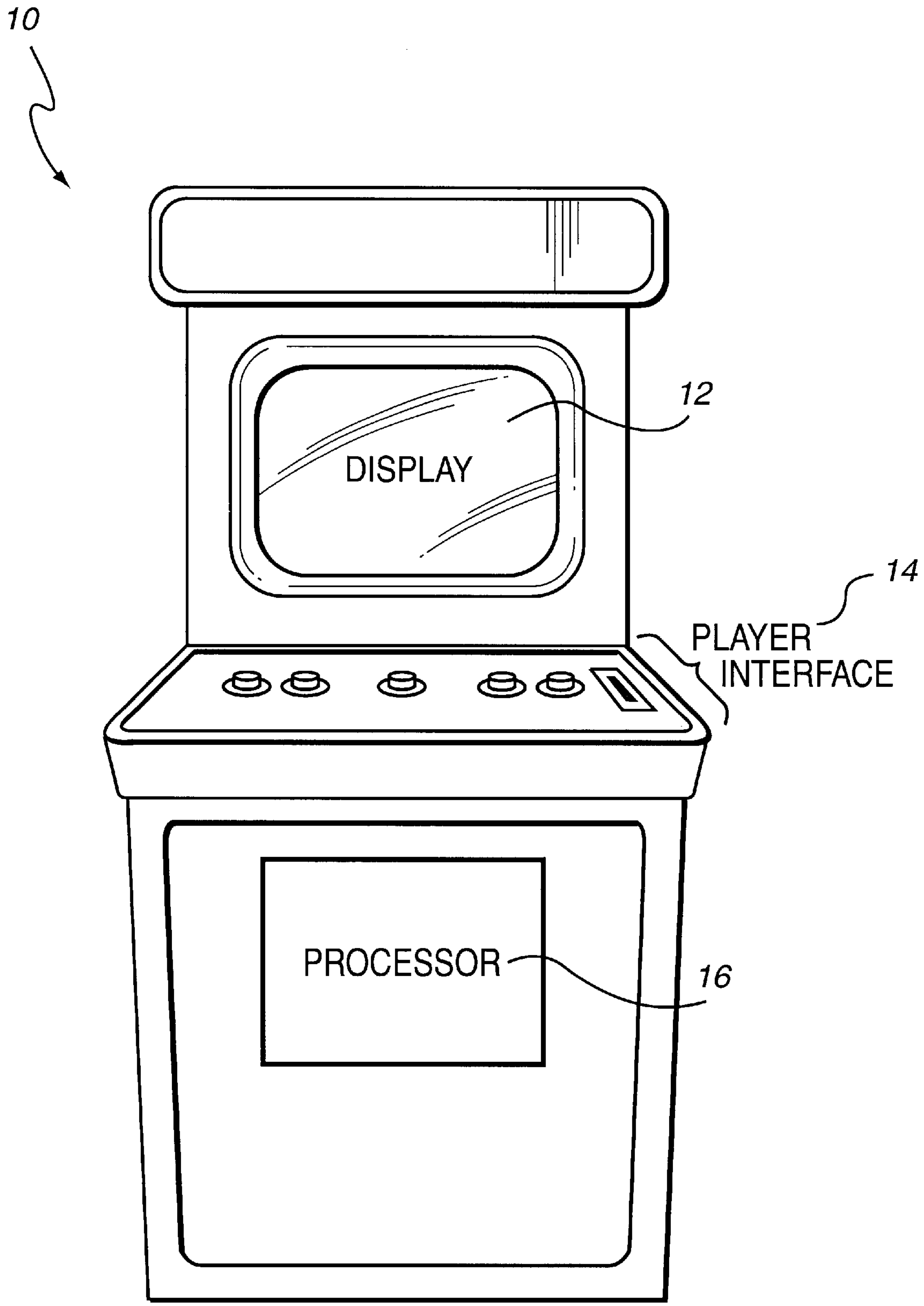
FIG. 1 is a block diagram illustrating the structure effecting game play according to the apparatus of the present invention.

FIG. 1 is a schematic illustration showing the components of a video game unit 10 configured or programmed with software for playing the game according to the invention. The software and programming of the game unit for carrying out the games according to the invention do not form part of the present invention and will thus not be further described. Those of ordinary skill in the art will contemplate various known means for such software and programming, and the invention is not meant to be limited to any particular means.

The game unit 10 includes a display 12, a player interface 14, and circuitry 16 for effecting game play and including structure for randomly generating patterns of symbols according to the present invention. The processing circuit 16 effects game play according to the rules of the game and resolves wagers based on resulting patterns and a comparison with established winning patterns.

Figure 2:
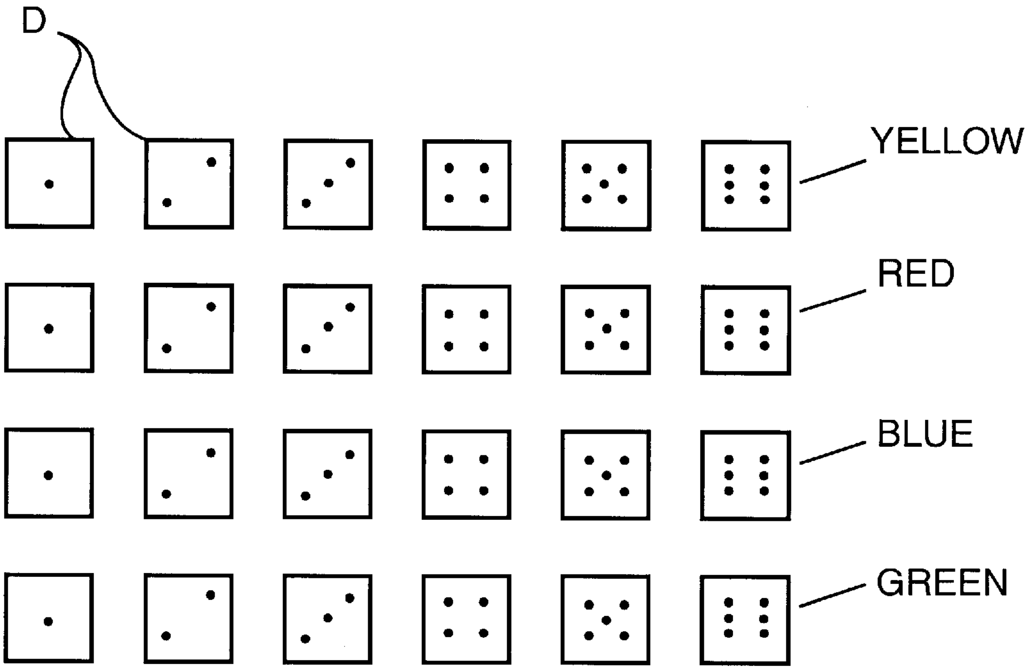
FIG. 2 is an exemplary display for one game embodiment according to the invention.

The concepts and playing modes according to the invention will be first described in conjunction with an application to a symbol representation of conventional dice. As shown in FIG. 2, the dice D are comprised of six-sided cubes with each side having a numerical value of 1–6, respectively, shown as spots in a square. Each die is preferably also colored, and four or more different colors may be provided. The dice symbol representation in the following examples is exemplary, and those of ordinary skill in the art will contemplate variations of core features according to the invention with or without the dice representations. The description is thus for exemplary purposes, and the invention is not meant to be limited to the described application.

The processor 16 drives the display 12 to display a pattern of symbols, such as the 4×6 matrix of dice symbols illustrated in FIG. 2. Payoff scales, rules and promotional material may also be displayed when the game is not being played. Upon commencing the game, play credits are established by a player by any suitable method including either coin or bill insertion or player card methodology via the player interface 14. Once a playing mode is established, the player activates the game via the player interface 14, and the display simulates a dice "roll" through a random number generation sequence of the appropriate number of, twenty-four in this example, different possibilities until stopping at a randomly generated resulting pattern. If the resulting pattern matches one of the winning patterns, the player is awarded credits according to the payout schedules for the selected game. Exemplary rankings of combination structures and winning patterns within each group are as follows:

One Pair
Three of a Kind
Four of a Kind
Five of a Kind
Six of a Kind
Two Pair
Three Pair
three of a Kind and a Pair
Three of a Kind and Three of a Kind
Four of a Kind and a Pair

| | |
|---|---|
| Straight | 1 2 3 4 5 6 in any order |
| Flush | all six the same color |
| Straight Flush | 1 2 3 4 5 6 in any order all in the same color |
| Sequential Straight Flush | 1 2 3 4 5 6 in order all in the same color |

The lowest possible hand is one pair as a hand without a pair would automatically be a straight. Therefore, there may not be payoffs awarded on some of the lower ranked hands such as one pair, two pair and three of a kind. The payout scales vary for each game and are generally based on the probability of achieving a particular winning pattern.

SINGLE LINE VERSIONS

EXAMPLE 1

In this game, the player award is made on the line as displayed and then a new game can commence.

EXAMPLE 2

In this game, the player has an option to retain any selected combination of symbols displayed by using known touch screen or hold button methodology and "roll" the unselected symbols as a method of drawing to the retained symbols and improving the generated display ranking. The payoff scale is necessarily lower than in Example 1 as the player has an opportunity to improve ranking.

EXAMPLE 3

In this game, either version 1 or 2 can be played or both versions 1 and 2 can be played. Players may select the mode of play, and two credits (wagers) may be required with both versions 1 and 2, with payoffs awarded twice. That is, with a winning pattern in the pre-draw display, a player would receive two payouts.

EXAMPLE 4

In this game, both Examples 1 and 2 are played but for a single credit application, offering two payoff opportunities but at a reduced pay scale.

EXAMPLE 5

In this game, both Examples 1 and 2 are played with double credit application as in Example 3; however, unlike Example 3, the payoff on the draw aspect of Example 2 is not on a permanent fixed scale but interactively varies according to the ranking achieved in Example 1.

EXAMPLE 6

In this game, both Examples 1 and 2 are played with single credit application as in Example 4; however, unlike Example 4, the payoff on the draw aspect of Example 2 is not on a permanent fixed scale but interactively varies according to the ranking achieved in Example 1.

MULTI-LINE VERSIONS

Each of Examples 1 through 6 may also be played in a multi-line format. Each multi-line format requires the appropriate credit application to play the maximum lines, or the player may select a lower number of lines.

The horizontal lines displayed could be as few as two, which could offer four lines of play, being the two horizontal lines and two zigzag style lines, incorporating alternatively one symbol from the top line and one symbol from the bottom line.

The horizontal lines displayed could be as many as six or more, which could provide with the dice embodiment, for example, a uniform 6×6 display that would allow at least fourteen lines, being six horizontal, six vertical and two diagonal. Further or alternative lines for winning patterns may be contemplated, such as a line extending at a forty-five degree angle and after encompassing three symbols changing direction by ninety degrees to encompass three more symbols at a forty-five degree angle.

With one criterion of six numerical definitions on each die and a second criterion of four color definitions, there are a total of twenty-four different symbols. When playing up to four horizontal lines of six across (4×6 matrix), all twenty-four symbols can be displayed through composite random number generation (i.e., all twenty-four possibilities will be included somewhere in the matrix without repeated symbols). When playing with six horizontal lines of six across, however, there must be duplication of symbols. In this situation, each of the thirty-six display areas "rolls" and displays through individual random number generation (i.e., each display area could result in any one of the twenty-four possibilities, including repeats of other display areas).

When using lines at or below the maximum available for composite generation, individual generation can still be used. For example, even in a single line version, the random number generation could be designed on an individual or composite basis.

MULTI-LINE TOTALS

Totals is a separate and additional wagering opportunity and is applied more appropriately to multi-line formats. Of course, a variety of lines are viable as is a variety of versions. Totals refers to display of certain defined symbols or groups of overall symbols within the overall total display, irrespective of line association. That is, a resulting pattern is a selection of the symbols from the matrix.

When using individual random generation in a thirty-six display format (6×6 matrix), thirty-six of the exact same number and color could be displayed, for example, a 6×6 matrix of 6-red. This creates the opportunity for very high odds payoffs.

WILD SYMBOLS

A display of five horizontal lines of five symbols creates twenty-five display areas and an opportunity for each of the twenty-four symbols to be displayed by composite random generation and a vacant display area. By adding a wild symbol or indicia to the display generation, this vacant space can be filled by the wild symbol. The wild symbol would be assigned a value according to specific game rules.

When using individual random generation, the wild symbol indicia could also be used. There is also the possibility for the wild symbol to be used as a temporary symbol only. That is, after the first "roll" all displayed units stay in place except wild symbols which "re-roll." The "re-roll" process is then repeated until no wild symbols are displayed. By this method, added "roll" excitement is provided without requiring players to add additional credits.

ALTERNATIVES

In an alternative embodiment, there are two symbols, "X" and "O," and each symbol is available in two colors, e.g., blue and red. A first option gives a payoff for a line when all symbols in that line are the same irrespective of color. A second option gives a payoff for a line when all symbols in that line are the same color irrespective of letter. A third option gives a payoff for a line when all symbols in that line are the same color and letter. Each of the three options may apply to totals where a maximum payoff is generated when all nine symbols are firstly either "X" or "O," or secondly either blue or red, or thirdly either X-blue, X-red, O-blue or O-red, with lesser payoffs for fewer than nine symbols.

Another embodiment in one mode incorporates a specific prescribed winning combination of one criterion irrespective of the other criterion, and in another mode, utilizes both criteria with lines and totals being available in both modes. Examples of prescribed combinations of one criterion could be as follows:

| | | |
|---|---|---|
| *OXO* | | *XOX* |
| *XOX* | or | *OXO* |
| *OXO* | | *XOX* |

Further, particularly within the variants where it is harder to achieve a winning result, an attractive feature is to provide a player payoff selection, wherein a player can choose whether to receive the win credits as displayed or forego the credits and retain selected symbols within the display in order to achieve improved symbol status through a secondary play. The payoff scale on the secondary play may be adjusted proportionally through the software and displayed prior to election of that mode. There is also the possibility of using each round as a separate round from a credit perspective of allowing symbol retention and payoff changes from round to round.

In another embodiment using dice, one display could provide thirty-six specific areas with six lines each way and two diagonal lines. Either any one number or a specific one number throughout could be the game goal or alternatively a specific prescribed winning goal combination could apply such as:

| | | | | | |
|---|---|---|---|---|---|
| 1 | 1 | 1 | 1 | 1 | 1 |
| 2 | 2 | 2 | 2 | 2 | 2 |
| 3 | 3 | 3 | 3 | 3 | 3 |
| 4 | 4 | 4 | 4 | 4 | 4 |
| 5 | 5 | 5 | 5 | 5 | 5 |
| 6 | 6 | 6 | 6 | 6 | 6 |

In an alternative embodiment using a deck of cards, one display would provide fifty-two specific areas with thirteen vertical lines and four horizontal lines. A specific winning goal combination could apply such as:

| | |
|---|---|
| 2 3 4 5 6 7 8 9 10 *J Q K* A | all clubs |
| 2 3 4 5 6 7 8 9 10 *J Q K* A | all diamonds |
| 2 3 4 5 6 7 8 9 10 *J Q K* A | all heart |
| 2 3 4 5 6 7 8 9 10 *J Q K* A | all spades |

In still another card embodiment, poker-style combinations could be used in lines, or totals could be applied to the formation of the best hand irrespective of card positions. For example, the following display assumes each card named is of the same suit, thus creating a royal flush (X denotes other cards here):

| | | | | |
|---|---|---|---|---|
| *X* | *X* | *J* | *X* | *X* |
| *Q* | *X* | *X* | *X* | *A* |
| *X* | *X* | *X* | *X* | *X* |
| *X* | *X* | *K* | *X* | *X* |
| *X* | *X* | *X* | *X* | 10 |

Figure 3:
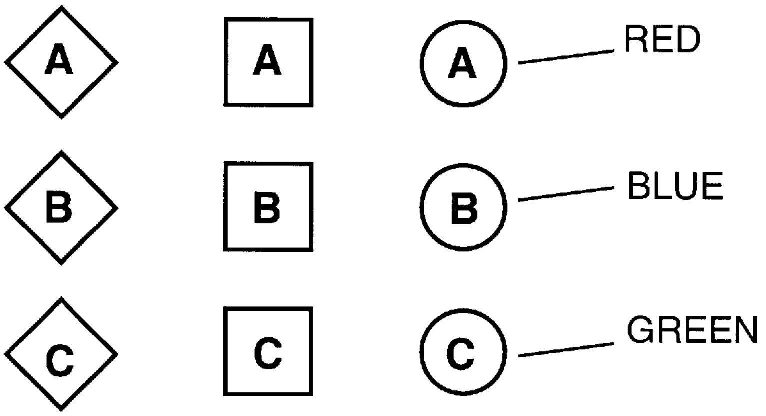
FIG. 3 is an exemplary display for another game embodiment according to the invention.

In still another variation, a game can be contemplated wherein the symbols have at least three defining criteria, such as shape (e.g., circle, square, diamond), color (e.g., red, green, blue), and designation (letter, number, playing card rank, characteristic, animation, or other visual definition). With three defining criteria, there are numerous options available for winning patterns. FIG. 3 is an exemplary display of winning patterns using a 3×3 matrix, incorporating the noted shapes, colors and the letters ABC. Payouts can be offered for winning combinations using single or multi-line play or totals. Each of the versions noted above could also incorporate the three criteria aspect of this embodiment, lending to possibilities of high odds payoffs, for example, for a totals game, with each display area in the matrix being of the same shape, color and letter.

In a related variation, the display could incorporate a three-dimensional image, such as a cube, allowing the player to play multiple lines and totals for any number of sides of the three-dimensional cube. In one alternative, three of the six sides can be displayed at a time, or each of the six sides can be displayed in rotation or other computer graphic special effect. With this arrangement, the player could be required to wager for each line, which in the three-side display context, would be as many as twenty-four wagers (three vertical, three horizontal, and two diagonal for each of the three sides) or alternatively for each side or aspect of the cube, etc. Certainly, those of ordinary skill in the art will contemplate numerous game variations, and the invention is not meant to be limited to any single example.

With the methodology according to the invention, numerous games and wagering opportunities can be provided for added excitement to a casino game of chance. The game is centered around a pattern such as a matrix of a plurality of symbols, which each of the symbols including at least two defining criteria, such as rank and/or number and color or the like. Resulting patterns are generated during game play, and payouts are paid based on wagers according to a selected mode of play, such as single line, multi-line, totals, draw, etc. The multitude of options available with this central concept of the invention provides the casino operator the advantage of offering a wide selection of games while enabling the players to play different games with varying payoffs and game volatility.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of playing a game of chance comprising:

(a) establishing at least one winning pattern of a plurality of symbols, wherein the symbols comprise six-sided dice and at least two additional defining criteria, the additional defining criteria being independently characteristic of each of the symbols, wherein the defining criteria is determinative of the winning pattern;

(b) receiving a first wager from a player that the winning pattern will occur;

(c) randomly generating a resulting pattern of the symbols; and (d) if the resulting pattern matches the winning pattern, paying a payout based on the first wager.

2. A method according to claim 1, wherein step (c) is practiced by (c1) defining a matrix of symbols, and wherein step (a) is practiced by (a1) establishing the winning pattern as a line of the symbols from the matrix of symbols.

3. A method according to claim 2, wherein step (c1) is practiced by defining the matrix of symbols as a square matrix, and wherein step (a1) is practiced by defining lines of symbols along columns, rows and diagonals of the square matrix.

4. A method according to claim 3, wherein step (b) is practiced by receiving an additional wager for each of additional ones of the lines to be played.

5. A method according to claim 2, wherein step (a) is practiced by establishing a first winning pattern as a plurality of symbols all having the same number or other defining criteria.

6. A method according to claim 1, further comprising (e) if the resulting pattern does not contain a match to the winning pattern, providing an option for the player to wager a second wager that the winning pattern will occur through a second selective regeneration of the resulting pattern.

7. A method according to claim 6, wherein if the second selective regeneration of the resulting pattern matches the winning pattern, the method further comprising (f) paying a payout based on the second wager.

8. A method according to claim 7, wherein step (f) is practiced by varying the payout based on a ranking achieved in step (c).

9. A method according to claim 1, wherein step (d) is practiced by paying varying payouts according to a rank of the combinations.

10. A method according to claim 9, wherein step (d) is further practiced by paying varying payouts according to symbol colors or shapes.

11. A method according to claim 1, wherein step (c) is practiced by (c1) defining a 4×6 matrix of symbols, and wherein step (a) is practiced by (a1) establishing the winning pattern as a line of the symbols from the 4×6 matrix of symbols.

12. A method according to claim 1, further comprising playing the game via a video game unit programmed via computer software.

13. A method according to claim 1, wherein step (c) is practiced by defining a matrix of symbols, and establishing the resulting pattern as a selection of the symbols from the matrix of symbols.

14. A method according to claim 13, wherein step (b) is practiced by receiving a wager for each selected row in the matrix.

15. A method according to claim 1, wherein the symbols comprise six-sided dice of four varying colors, defining twenty-four symbol variations, and wherein step (c) comprises defining a 5×5 matrix of symbols including the twenty-four symbol variations and one wild indicia.

16. A method according to claim 1, wherein the at least two additional defining criteria comprises at least one of varying colors or varying shapes.

17. A method according to claim 1, wherein step (a) is practiced by establishing the winning pattern based on poker-style combinations.

18. An apparatus configured for playing a game of chance comprising a display, a player interface for receiving player input, and a processor configured to effect game play, the processor enabling:

(a) establishing at least one winning pattern of a plurality of symbols, wherein the symbols comprise six-sided dice and at least two additional defining criteria, the additional defining criteria being independently characteristic of each of the symbols, wherein the defining criteria is determinative of the winning pattern;

(b) receiving a first wager from a player that the winning pattern will occur;

(c) randomly generating a resulting pattern of the symbols; and (d) if the resulting pattern matches the winning pattern, paying a payout based on the first wager.

19. An apparatus according to claim 18, wherein step (c) is practiced by (c1) defining a matrix of symbols, and wherein step (a) is practiced by (a1) establishing the winning pattern as a line of the symbols from the matrix of symbols.

20. An apparatus according to claim 19, wherein step (c) is practiced by defining the matrix of symbols as a square matrix, and wherein step (a1) is practiced by defining lines of symbols along columns, rows and diagonals of the square matrix.

21. An apparatus according to claim 20, wherein step (b) is practiced by receiving an additional wager for each of additional ones of the lines to be played.

22. An apparatus according to claim 19, wherein step (a) is practiced by establishing a first winning pattern as a plurality of symbols all having the same number or other defining criteria.

23. An apparatus according to claim 18, further comprising (e) if the resulting pattern does not contain a match to the winning pattern, providing an option for the player to wager a second wager that the winning pattern will occur through a second selective regeneration of the resulting pattern.

24. An apparatus according to claim 23, wherein if the second selective regeneration of the resulting pattern matches the winning pattern, the apparatus further enabling (f) paying a payout based on the second wager.

25. An apparatus according to claim 24, wherein step (f) is practiced by varying the payout based on a ranking achieved in step (c).

26. An apparatus according to claim 18, wherein step (d) is practiced by paying varying payouts according to a rank of the combinations.

27. An apparatus according to claim 26, wherein step (d) is further practiced by paying varying payouts according to symbol colors or shapes.

28. An apparatus according to claim 18, wherein step (c) is practiced by (c1) defining a 4×6 matrix of symbols, and wherein step (a) is practiced by (a1) establishing the winning pattern as a line of the symbols from the 4×6 matrix of symbols.

29. An apparatus according to claim 18, further comprising playing the game via a video game unit programmed via computer software.

30. An apparatus according to claim 18, wherein step (c) is practiced by defining a matrix of symbols, and establishing the resulting pattern as a selection of the symbols from the matrix.

31. An apparatus according to claim 30, wherein step (b) is practiced by receiving a wager for each row in the matrix.

32. An apparatus according to claim 18, wherein the symbols comprise six-sided dice of four varying colors, defining twenty-four symbol variations, and wherein step (c) comprises defining a 5×5 matrix of symbols including the twenty-four symbol variations and one wild indicia.

33. An apparatus according to claim 18, wherein the at least two additional defining criteria comprises at least one of varying colors or varying shapes.

34. An apparatus according to claim 18, wherein step (a) is practiced by establishing the winning pattern based on poker-style combinations.

35. A game of chance comprising:

means for establishing at least one winning pattern of a plurality of symbols, wherein each of the symbols includes at least three defining criteria, the defining criteria being independently characteristic of each of the symbols, wherein the defining criteria is determinative of the winning pattern;

means for receiving a first wager from a player that the winning pattern will occur;

means for randomly generating a resulting pattern of the symbols; and if the resulting pattern matches the winning pattern, means for paying a payout based on the first wager.

36. A game of chance comprising:

a winning pattern unit that establishes at least one winning pattern of a plurality of symbols, wherein each of the symbols includes at least three defining criteria, the defining criteria being independently characteristic of each of the symbols, wherein the defining criteria is determinative of the winning pattern;

a payment receiving unit that receives a first wager from a player that the winning pattern will occur;

a random number generator that randomly generates a resulting pattern of the symbols; and a payout unit that effects a payout based on the first wager if the resulting pattern matches the winning pattern.

37. A method of playing a game of chance comprising:

(a) establishing at least one winning pattern of a plurality of symbols, wherein each of the symbols includes at least three defining criteria, the defining criteria being independently characteristic of each of the symbols, wherein the defining criteria is determinative of the winning pattern;

(b) receiving a first wager from a player that the winning pattern will occur;

(c) randomly generating a resulting pattern of the symbols; and (d) if the resulting pattern matches the winning pattern, paying a payout based on the first wager.

38. A method according to claim 37, wherein the symbols comprise playing cards, and wherein step (a) is practiced by establishing the winning pattern with the playing cards according to poker-style combinations.

* * * * *